United States Patent
Hoover et al.

(10) Patent No.: US 8,825,008 B2
(45) Date of Patent: Sep. 2, 2014

(54) METHOD AND APPARATUS FOR AUTHORIZING TRANSFER OF MOBILE DEVICES

(75) Inventors: Scott J. Hoover, Allen, TX (US); Joseph A. Hilburn, Frisco, TX (US); Paul V. Hubner, McKinney, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 69 days.

(21) Appl. No.: 13/333,326

(22) Filed: Dec. 21, 2011

(65) Prior Publication Data
US 2013/0165072 A1  Jun. 27, 2013

(51) Int. Cl.
*H04M 1/66* (2006.01)
*H04W 12/12* (2009.01)

(52) U.S. Cl.
CPC .................... *H04W 12/12* (2013.01)
USPC ........ 455/411; 455/435; 455/414.1; 455/403; 455/406

(58) Field of Classification Search
CPC .................................................. H04W 12/12
USPC .............. 455/411, 435, 414.1, 440, 403, 406; 713/170; 726/3
See application file for complete search history.

(56) References Cited

U.S. PATENT DOCUMENTS

| | | | | |
|---|---|---|---|---|
| 6,859,651 | B2* | 2/2005 | Gabor | 455/411 |
| 7,289,631 | B2* | 10/2007 | Ishidoshiro | 380/270 |
| 7,295,522 | B2* | 11/2007 | Shell et al. | 370/252 |
| 8,041,035 | B2* | 10/2011 | Miller | 380/255 |
| 8,312,514 | B2* | 11/2012 | Anderson | 726/3 |
| 8,483,659 | B2* | 7/2013 | Mahajan | 455/411 |
| 2002/0061748 | A1* | 5/2002 | Nakakita et al. | 455/435 |
| 2005/0190764 | A1* | 9/2005 | Shell et al. | 370/389 |
| 2005/0239445 | A1* | 10/2005 | Karaoguz et al. | 455/414.1 |
| 2005/0257055 | A1* | 11/2005 | Anderson | 713/170 |
| 2006/0193321 | A1* | 8/2006 | Shell et al. | 370/389 |
| 2007/0033287 | A1* | 2/2007 | Kiyose et al. | 709/229 |
| 2007/0129049 | A1* | 6/2007 | Endo et al. | 455/403 |
| 2011/0039592 | A1* | 2/2011 | Haddad et al. | 455/515 |

* cited by examiner

*Primary Examiner* — David Q Nguyen

(57) ABSTRACT

An approach is presented for providing the authorized transfer of a mobile device. A platform receives a request to modify ownership status information for a mobile device, and generates in response to the request, a sale identifier based on the ownership status, wherein the sale identifier provides verification that the mobile device can be subject to a transfer of ownership, and specifies device information associated with the mobile device.

22 Claims, 10 Drawing Sheets

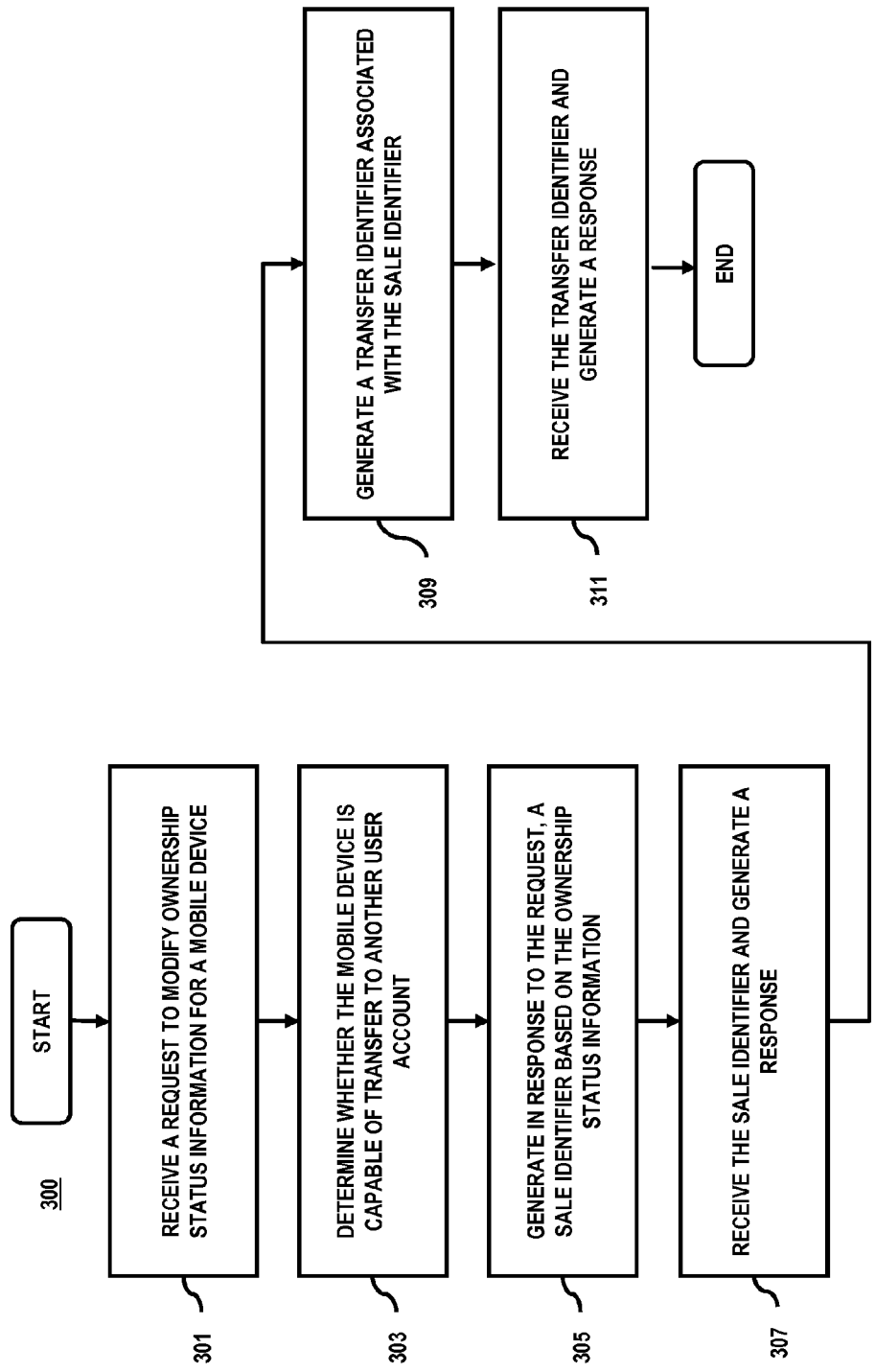

US 8,825,008 B2

METHOD AND APPARATUS FOR AUTHORIZING TRANSFER OF MOBILE DEVICES

BACKGROUND INFORMATION

Wireless networking technologies offer users the convenience of mobility and ease of connection to a network. As mobile devices (e.g., smartphones, netbooks, etc.) continue to expand in functionality, so does the benefit for users to continually replace the outdated mobile devices with new enhanced mobile devices. Further, early adoption of mobile phones has been in vogue, as ever more sophisticated applications and services are offered by service providers. However, the replacement costs to consumers may rapidly become prohibitive. To curb the costs of frequent upgrades, consumers rely on the secondary market to resell the devices. Unfortunately, the marketplace for pre-owned mobile devices has been largely untrustworthy, as such devices are routinely stolen or misplaced. Further, under either of these scenarios, the mobile devices may be designated as lost or stolen, thereby rendering them as lost assets to the consumer and the service provider.

Therefore, there is a need for an approach to facilitate transfer of ownership of mobile devices.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 3 is a flowchart of a process for providing authorized transfer of a mobile device, according to an exemplary embodiment;

DESCRIPTION OF THE PREFERRED EMBODIMENT

An apparatus, method and system for providing authorized transfer of a mobile device are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
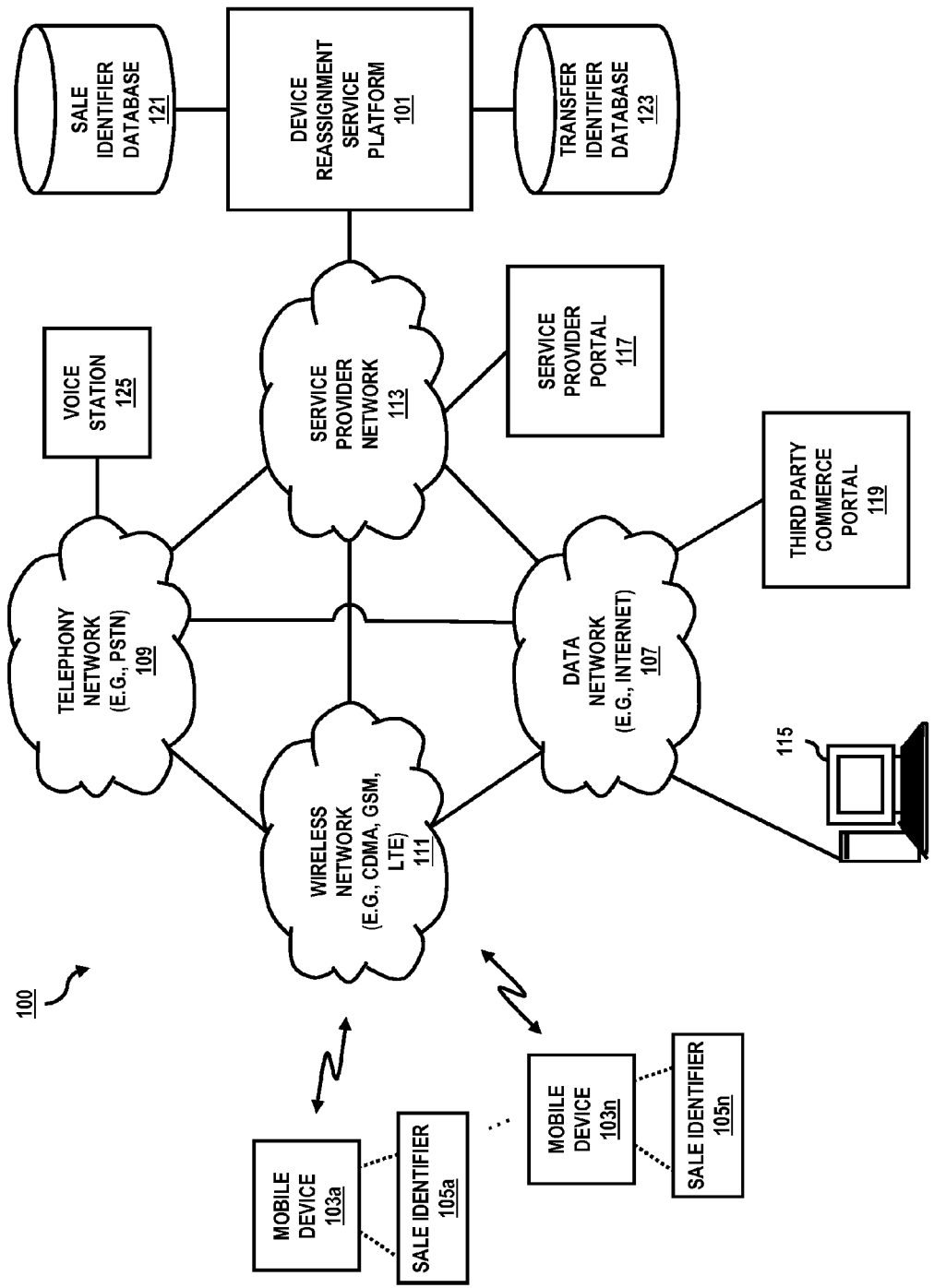
FIG. 1 is a diagram of a system capable of providing authorized transfer of a mobile device, according to an exemplary embodiment.

FIG. 1 is a diagram of a system capable of providing authorized transfer of a mobile device, according to an exemplary embodiment. For the purpose of illustration, the system 100 employs a device reassignment service platform 101 that is configured to provide authorized (or verified) transfer of ownership of a mobile device (e.g., mobile device 103) to facilitate, for example, the exchange, sale, and reactivation of pre-owned mobile devices as well as the reclaiming of, for instance, lost mobile devices. In some embodiments, platform 101 generates identifiers that are used to authorize transfers (or reassignments) of mobile devices. In certain embodiments, two types of identifiers are utilized: a sale identifier (e.g., sale identifiers 105) and a transfer identifier. As used herein, a sale identifier may be any indicia that can be used to identify a mobile device. A transfer identifier may be any indicia that can be used to indicate a transfer of ownership of a mobile device. The authorized transfer of a mobile device service may, for instance, be initiated using one or more user devices (e.g., mobile devices 103) over one or more networks (e.g., data network 107, telephony network 109, wireless network 111, service provider network 113, etc.).

In certain embodiments, users my utilize a computing device 115 (e.g., laptop, desktop, web appliance, netbook, etc.) to access platform 101 via service provider portal 117. Service provider portal 117 provides, for example, a web-based user interface to allow users to access the services of platform 101. In the manner, such users can specify certain preferences for the device reassignment service.

According to one embodiment, the service may be part of managed services supplied by a service provider (e.g., a wireless communication company) as a hosted or subscription-based service made available to users of the mobile devices 103 through a service provider network 113. As shown, platform 101 may be a part of or connected to the service provider network 113. According to another embodiment, platform 101 may be include within or connected to the mobile devices 103, a computing device 115, etc.

Further, platform 101 may be connected to a third party commerce portal 119, such as an online auction (e.g., EBAY), a fixed price consumer-to-consumer shopping website (e.g., half.com, AMAZON MARKETPLACE), online classified advertisements (e.g., CRAIGSLIST), and traditional advertising methods (e.g., newspaper, magazine, mailer, etc.), and the like. It is contemplated that the service provider network 113 may contain a classified system (e.g., online auction, fixed price consumer-to-consumer shopping website, online classified advertisement, etc.) to facilitate the sale and/or transfer of mobile devices.

As mentioned, due to the continued expansion in functionality of mobile devices, users frequently replace outdated mobile devices with new enhanced mobile devices. Additionally, many lost or stolen mobile devices are later recovered after a replacement has been obtained. Often times, users attempt to defray costs (e.g., contract fee, termination fee, mobile device cost, etc.) of replaced or upgraded mobile devices using online auctions, shopping websites, centralized network of online communicates, and the like. However, many potential buyers are discouraged by the possibility of fraudulent transactions, such as falsifying a description of the mobile device for sale, registering the mobile device as stolen (i.e., rendering the device unusable), and the like. Further, users and service providers are frequently unable to recuperate the cost of lost or stolen mobile devices because such mobile devices are marked (e.g., by ESN) as stolen and rendered unusable.

To address this issue, the system 100 of FIG. 1 introduces the capability to authorize or verify the transfer of mobile devices using platform 101. By way of example, potential buyers of mobile device 103a send a sale identifier 105 associated with mobile device 103a to platform 101 and receive verification that mobile device 103a is authorized for transfer. Further, platform 101 may be configured to generate a transfer identifier to transfer the ownership of a mobile device 103. For example, a buyer receives a transfer identifier, sends the transfer identifier to platform 101 along with identifying information (e.g., account number, name, address, etc.); and platform 101 uses the transfer identifier to activate or setup mobile device 103a on the buyers account. Additionally, the sale identifiers may be used to facilitate the return of lost or stolen phones by causing the display of a sales identifier that may be used to locate an owner.

As used herein, mobile devices 103 may be any type of mobile terminal including a mobile handset, mobile station, mobile unit, multimedia computer, multimedia tablet, communicator, netbook, Personal Digital Assistants (PDAs), smartphone, media receiver, etc. It is also contemplated that the mobile devices 103 may support any type of interface for supporting the presentment or exchange of data. In addition, mobile devices 103 may facilitate various input means for receiving and generating information, including touch screen capability, keyboard and keypad data entry, voice-based input mechanisms, accelerometer (e.g., shaking the mobile device 103), and the like. Any known and future implementations of mobile devices 103 are applicable. It is noted that, in certain embodiments, the mobile devices 103 may be configured to transmit a sale identifier using a variety of technologies—i.e., near field communication (NFC), BLUETOOTH, infrared, etc. Also, connectivity may be provided via a wireless local area network (LAN). By way of example, a group of mobile devices 103 may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each mobile device 103, i.e., IP addresses that are accessible to devices connected to the service provider network 113 as facilitated via a router.

In some embodiments, platform 101, the mobile devices 103, and other elements of the system 100 may be configured to communicate via the service provider network 113. According to certain embodiments, one or more networks, such as the data network 107, the telephony network 109, and/or the wireless network 111, may interact with the service provider network 113. The networks 107-113 may be any suitable wireline and/or wireless network, and be managed by one or more service providers. For example, the data network 107 may be any local area network (LAN), metropolitan area network (MAN), wide area network (WAN), the Internet, or any other suitable packet-switched network, such as a commercially owned, proprietary packet-switched network, such as a proprietary cable or fiber-optic network. For example, computing device 115 may be any suitable computing device, such as a VoIP phone, skinny client control protocol (SCCP) phone, session initiation protocol (SIP) phone, IP phone, personal computer, softphone, workstation, terminal, server, etc. The telephony network 109 may include a circuit-switched network, such as the public switched telephone network (PSTN), an integrated services digital network (ISDN), a private branch exchange (PBX), or other like network. For instance, voice station 125 may be any suitable plain old telephone service (POTS) device, facsimile machine, etc. Meanwhile, the wireless network 111 may employ various technologies including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like.

Although depicted as separate entities, the networks 107-113 may be completely or partially contained within one another, or may embody one or more of the aforementioned infrastructures. For instance, the service provider network 113 may embody circuit-switched and/or packet-switched networks that include facilities to provide for transport of circuit-switched and/or packet-based communications. It is further contemplated that the networks 107-113 may include components and facilities to provide for signaling and/or bearer communications between the various components or facilities of the system 100. In this manner, the networks 107-113 may embody or include portions of a signaling system 7 (SS7) network, Internet protocol multimedia subsystem (IMS), or other suitable infrastructure to support control and signaling functions.

In certain embodiments, platform 101 may include or have access to sale identifiers stored in a sale identifier database 121. The sale identifier is indicia of a mobile device, such as characteristics of the mobile device, identifying information of an owner of the mobile device, an ownership status of the mobile device (e.g., marked for sale, restrictions to transfer, etc.), a date the sale identifier was generated (and thus verified to be capable for a transfer of ownership), and the like. Characteristics of the mobile device may indicate a type (e.g., smartphone, table, portable media player, game console, pager, etc.), a model, an age, a color, a time of use (e.g., minutes of talk time, data usage, hours activated, etc.), a current location, and the like. By way of example, platform 101 may access the sale identifier database 121 to acquire sale identifier information associated with one or more users of the mobile devices 103. The platform 101 may be configured to send information associated with sale identifiers to enable users access to information of a mobile device associated with the sale identifier. In this manner, a potential buyer of mobile device 103a may send sale identifier 105a to platform 101, which retrieves information about mobile device 103a stored in the sale identifier database 121 and sends the information to the potential buyer.

In certain embodiments, platform 101 may include or have access to transfer identifiers stored in a transfer identifier database 123. For example, platform 101 may access the transfer identifier database 123 to authenticate an attempt to transfer ownership of a mobile device, and to facilitate the generation of a transfer identifier (e.g., verify uniqueness of a generated transfer identifier). By way of example, platform 101 generates a transfer identifier, verifies the generated transfer identifier is not present in the transfer identifier database 123 (i.e., the generated transfer identifier is unique), securely sends the unique transfer identifier to a buyer, and stores the transfer identifier in the transfer identifier database 123. In one embodiment, a transfer identifier may be examined by platform 101 to determine a mobile device to be transferred. For example, platform 101 may encrypt an identifier of a mobile device, such as a sale identifier, ESN, MEID, MAC address, MDN, and the like. In another embodiment, the transfer identifier database 123 associates a transfer identifier with an identifier of the mobile device to be transferred.

While specific reference will be made thereto, it is contemplated that the system 100 may embody many forms and include multiple and/or alternative components and facilities.

Figure 2:
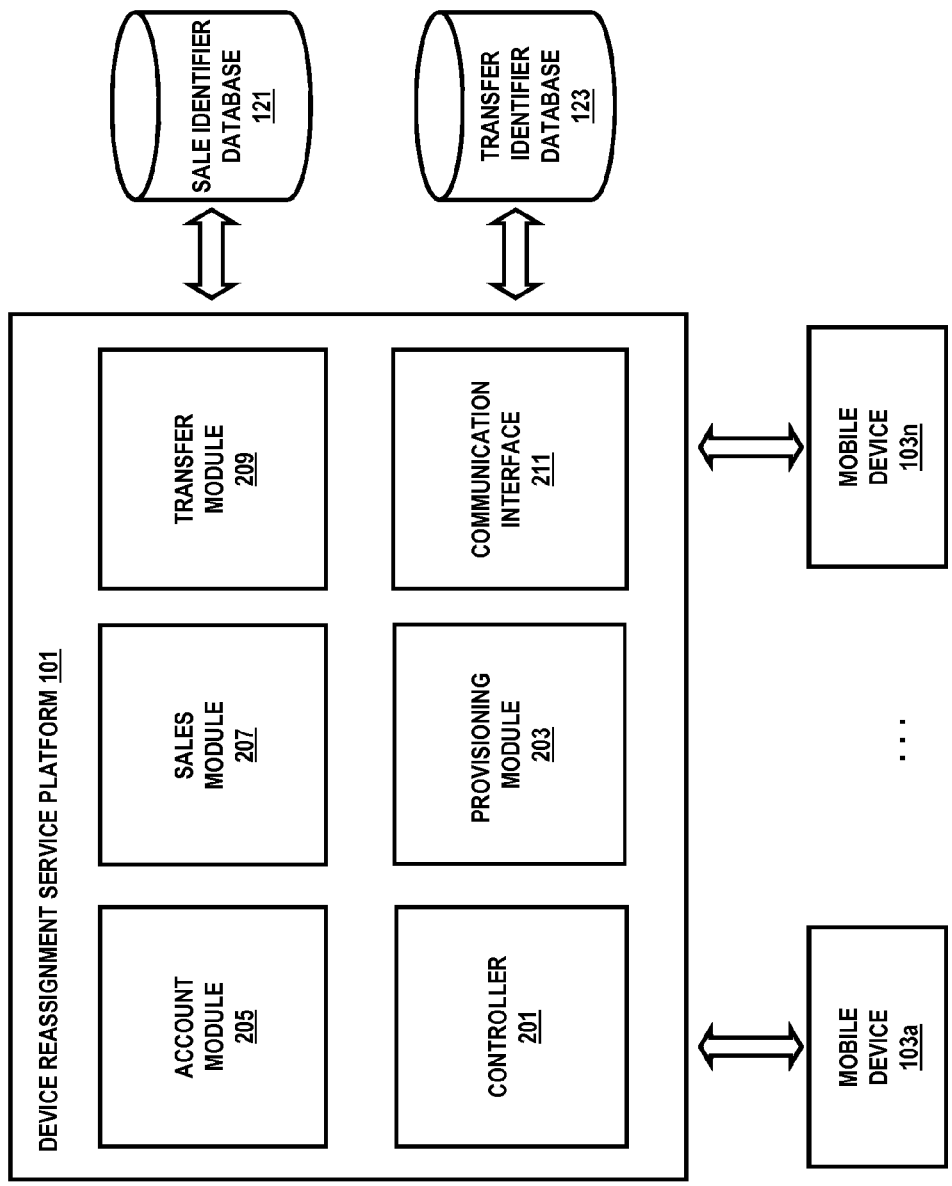
FIG. 2 is a diagram of the components of a device reassignment service platform, according to an exemplary embodiment.

FIG. 2 is a diagram of the components of a platform 101, according to an exemplary embodiment. The platform 101 may comprise computing hardware (such as described with respect to FIGS. 7 and 8), as well as include one or more components configured to execute the processes described herein for providing authorized transfer of a mobile device of the system 100. It is contemplated that the functions of these components may be combined in one or more components or performed by other components of equivalent functionality. In one implementation, platform 101 includes a controller 201, provisioning module 203, account module 205, sales module 207, transfer module 209, and communication interface 211.

The controller 201 may execute at least one algorithm for executing functions of platform 101. For example, the controller 201 may interact with the account module 205 to detect and notify the owner of mobile device 103a of a request to verify authorization to transfer mobile device 103a. The account module 205 may then obtain updated information (e.g., current usage time), and location information of mobile device 103a. Location information may be determined using various technologies and techniques, including WiFi, NFC, BLUETOOTH, infrared, global positioning system (GPS), cell ID, triangulation, etc.

The provisioning module 203 may deliver mobile content to the mobile device 103 to enable authorized transfer of a mobile device. The provisioning module 201 may also update, for example, the version, language settings, or type of installation for platform 101. By way of example, mobile device 103a may detect an authorization to transfer, request and display a sale identifier, and send status information (e.g., location, usage information, etc.) to platform 101.

The account module 205 may determine ownership information (e.g., owner identity, ownership status, etc.) of a mobile device, process requests to transfer ownership of a mobile device, and credit or charge accounts (e.g., contractual fee, termination fee, activation fee, credit for a referral resulting in a new contract, etc.). As used herein, ownership information may include an indication of authorized users, an indication of status information, and an indication of restrictions, and the like.

In some embodiments, authorized users may include users such as a user having physical possession of a mobile device, a user associated with billing (charges and credits) associated with services provided to a mobile device, a primary account holder of an account associated with a mobile device, a primary user of the mobile device, and the like. In one embodiment, multiple users may be authorized, for example, a primary user, and a primary account holder. In another embodiment, no user is authorized, for example, if ownership of the mobile device is maintained by a service provider.

Also, status information may indicate whether or not a particular mobile device (e.g., mobile device 103a) is authorized or marked for sale and/or is authorized for further charges with respect to one or more services associated with the particular mobile device. In one embodiment, mobile device 103a may have ownership status information indicating a status of authorized, and deauthorized. That is, an authorized status indicates that additional charges are authorized for one or more services associated with mobile device 103a, and a deauthorized status indicates that no further charges are authorized for services associated with mobile device 103a. It is contemplated that changing a status from authorized to deauthorized may result in a charge (e.g., early termination fee) on an account associated with mobile device 103a (e.g., authorized user account). Additionally, or alternatively, mobile device 103a may have ownership status information indicating whether mobile device 103a is for sale. In this manner, users may opt for one of a variety of options. As one option, the status information indicates mobile device 103a is not for sale and not authorized, and thus, mobile device 103a is disabled from further use by the service provider. It is contemplated that marking mobile device 103a not for sale and not authorized may facilitate the recovery of lost or stolen phones by deactivating services, preventing transfer, and displaying return information (e.g., mailing address, prepaid shipping label, etc.). In another scenario, the status information indicates mobile device 103a is active but not for sale. Consequently, another option allows users to prevent the inadvertent sale of mobile devices. In yet another option, the status information indicates mobile device 103a is for sale and not active; hence, this option allows users to sell unwanted mobile devices without inadvertently accumulating charges for unwanted services. In a further option, the status information indicates mobile device 103a is active and for sale in order to permit users to continue use of one or more services of mobile device 103a while also use platform 101 to facilitate the sale of mobile device 103a.

In addition to status information, ownership information may also specify restrictions to device transfers. In one example, a service provider restricts the transfer of mobile device 103a due to unpaid balances associated with mobile device 103a. In another example, a user (e.g., an authorized user) associated with mobile device 103a restricts the transfer of mobile device 103a due to a loss or theft of mobile device 103a. In this manner, platform 101 verifies a mobile device is capable of a transfer of ownership.

Ownership information may be stored in a database connected to platform 101, in the service provider network 113, a data network 107, and the like. The account module 205 may process a request to transfer ownership of a mobile device by updating ownership information. By way of example, the account module 205 may process a request to transfer ownership of mobile device 103a from a first user to a second user by associating further charges and credits associated with mobile device 103a with an account associated with the second user, and the primary user of mobile device 103a may be associated with the second user. It is contemplated that the user activating or authorizing further charges may agree to a service contract associated with the mobile device and may pay a service fee associated with the activating of the mobile device.

According to one embodiment, platform 101 may include a sales module 207 for generating sale identifiers, causing the storing of generated sale identifiers, and sending information associated relating to a received sale identifier. As noted, sale identifiers are generated to be unique and can include various information (e.g., alphanumeric, numeric, etc.), and may be stored in the sale identifier database 121, which may also contain information associated (or related) to the sale identifier. The sales module 207 may also generate a control message causing a mobile device to output the sale identifier by use of a display, near field communications (NFC), BLUETOOTH, WiFi, short message service (SMS) text, multimedia messaging service (MMS), QR code, and the like. In this manner, potential buyers may be provided access to the generated sale identifier. It is contemplated that the control message causing the output of the sale identifier may also be configured to disable or deauthorize one or more service on the mobile device.

According to one embodiment, platform 101 may include a transfer module 209 for generating transfer identifiers, causing the storing of generated transfer identifiers, and causing an update to ownership information in response to receiving a transfer identifier. As noted, transfer identifiers are generated to be unique and can include various information (e.g., alphanumeric, numeric, etc.), and may be stored in the transfer identifier database 123, which may also contain information associated (or related) to the transfer identifier. The transfer module 209 causes an update to ownership information in response to receiving a transfer identifier by determining a mobile device to transfer (e.g., decoding an encrypted transfer identifier, or causing a look-up of information associated with a transfer identifier in transfer identifier database 123), and requesting the account module 205 to process a request to transfer ownership of the determined mobile device.

The platform 101 may further include a communication interface 211 to communicate with other components of platform 101, the mobile devices 103, and other components of the system 100. The communication interface 211 may include multiple means of communication. For example, the communication interface 211 may be able to communicate over short message service (SMS), multimedia messaging service (MMS), internet protocol, instant messaging, voice sessions (e.g., via a phone network), email, near field communications (NFC), QR code, or other types of communication. Additionally, communication interface 211 may include a web portal (e.g., service provider portal 117) accessible by, for example, mobile device 103, computing device 115 and the like.

It is contemplated that to prevent unauthorized access, platform 101 may include an authentication identifier when transmitting signals to mobile devices 103. For instance, control messages may be encrypted, either symmetrically or asymmetrically, such that a hash value can be utilized to authenticate received control signals, as well as ensure that those signals have not been impermissibly alerted in transit. As such, communications between the mobile devices 103 and platform 101 may include various identifiers, keys, random numbers, random handshakes, digital signatures, and the like.

FIG. 3 is a flowchart of a process for providing the authorized transfer of a mobile device, according to an exemplary embodiment. For illustrative purpose, process 300 is described with respect to the systems of FIGS. 1 and 2. It is noted that the steps of process 300 may be performed in any suitable order, as well as combined or separated in any suitable manner. The process 300 may be performed by platform 101, in one embodiment. In step 301, the process 300 receives a request to modify ownership status information for mobile device 103a. The request may be using any of the means described with respect to the communication interface 211, and may include any information indicating a request to modify information such as text noting an interest to sell mobile device 103a, text indicating a code associated with modifying ownership status (e.g., set status to sale) of mobile device 103a, and the like. Once the process 300 receives the request, process 300 determines, as in step 303 whether mobile device 103a is capable of transfer to another user account. Mobile device 103a may be capable of a transfer of ownership if the request to modify ownership is associated with a user having authority to transfer ownership (e.g., an authorized user of mobile device 103a), if the ownership information associated with mobile device 103a indicates a status allowing the transfer, and the ownership information indicates mobile device 103a is not subject to any restrictions.

After the capability to transfer mobile device 103a has been determined, the process 300 generates, as in step 305, in response to the request, a sale identifier based on the ownership status information of mobile device 103a. The response to the request a sale identifier may include notification to a user associated with mobile device 103a (e.g., primary user, account holder) and/or a notification to the requester. By way of example, the process 300 may generate in response to the request a notification to a primary user of mobile device 103a that the request is denied due to the requester not being an authorized user (e.g., a user account not associated with mobile device 103a), and/or due to a restriction (e.g., an unpaid balance on the account associated with mobile device 103a). Additionally, or alternatively, the response may cause mobile device 103a ownership status information to change. For example, mobile device 103a may have ownership status information modified from "not for sale" to "for sale." It is contemplated that the process 300 may generate a response modifying the ownership status information of mobile device 103a to deauthorized. Additionally, the process 300 may cause mobile device 103a to display or present the generated sale identifier.

The process 300 then receives, as in step 307, the sale identifier and generates a response. The response may involve determining whether the received sale identifier is associated with mobile device 103a and whether mobile device 103a can be subject to a transfer of ownership (e.g., marked for sale, no restrictions, etc.), sending notifications to one or more users associated with the sale identifier, retrieving and/or generating information associated with the sale identifier (e.g., owner contact information, device type, model, etc.), and the like. It is contemplated that the response may also specify information relating to an owner of mobile device 103a (e.g., e-mail, mailing address, account name, mobile device number (MDN), etc.), or a date the sale identifier was generated.

By way of example, platform 101 sends the generated sale identifier to mobile device 103a, mobile device 103a sends the sale identifier to another mobile device (e.g., mobile device 103b) associated with a potential buyer (via NFC, a display, SMS text, etc.), and the potential buyer causes the mobile device (e.g., mobile device 103b) to send the sale identifier to platform 101. In another example, the sale identifier is posted on a secondary market (e.g., third party commerce portal 119), and a potential buyer enters the sale identifier in a web portal that sends the sale identifier to platform 101.

The process 300 then generates, as in step 309, a transfer identifier associated with the sale identifier. As noted, the transfer identifier facilitates the transfer of mobile device 103a from one user account to another user account. In one embodiment, the generating of a transfer identifier is performed once a sale identifier is generated. In another embodiment, the generating of a transfer identifier is performed in response to a request (or authorization) from an authorized user of mobile device 103a to transfer ownership of mobile device 103a to another user account. The transfer identifier is made available to a user indicated by the seller (e.g., authorized user). That is, the authorized user of mobile device 103a sends a message (e.g., SMS, web portal, etc.) to platform 101 indicating a user (e.g., buyer). The transfer identifier is made available to the indicated user by use of, for example, SMS texting, e-mail, web portal, and the like. It is contemplated that only the indicated user and platform 101 (i.e., not the authorized user) may have access to the transfer identifier.

In step 311, the transfer identifier is received, and a response is generated. The transfer identifier may be received along with a request to transfer the ownership of mobile device 103a. Such a response may cause ownership status information to indicate a change (or update) of the ownership from one user account to another user account. Additionally, or alternatively, the process 300 may generate a notification to one or more users indicating a failed or successful attempt to transfer mobile device 103a. Further, charges and/or credits may be applied to one or more accounts associated with the transfer of mobile device 103a. That is, the seller account (e.g., authorized user account) may have a credit applied; and the buyer account (e.g., indicated user account) may have a fee (e.g., activation fee) charged on the buyer account. Once the transfer identifier is received and processed, it is contemplated that the sale identifier and the transfer identifier may be deleted or otherwise be disassociated from mobile device 103a.

Figure 4A:
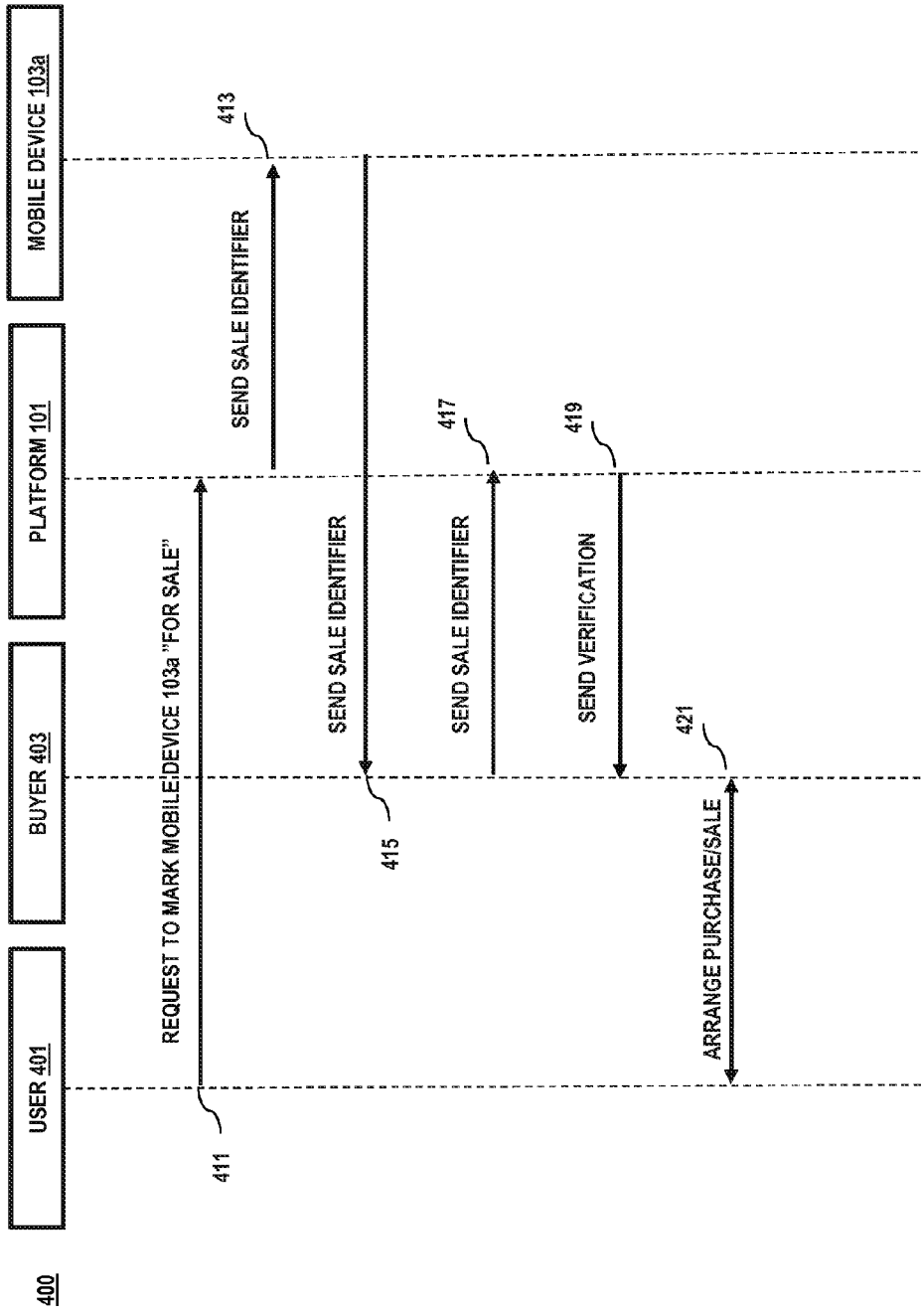
FIGS. 4A and 4B are ladder diagrams of a process of providing authorized transfer of a mobile device, according to an exemplary embodiment.
Figure 4B:
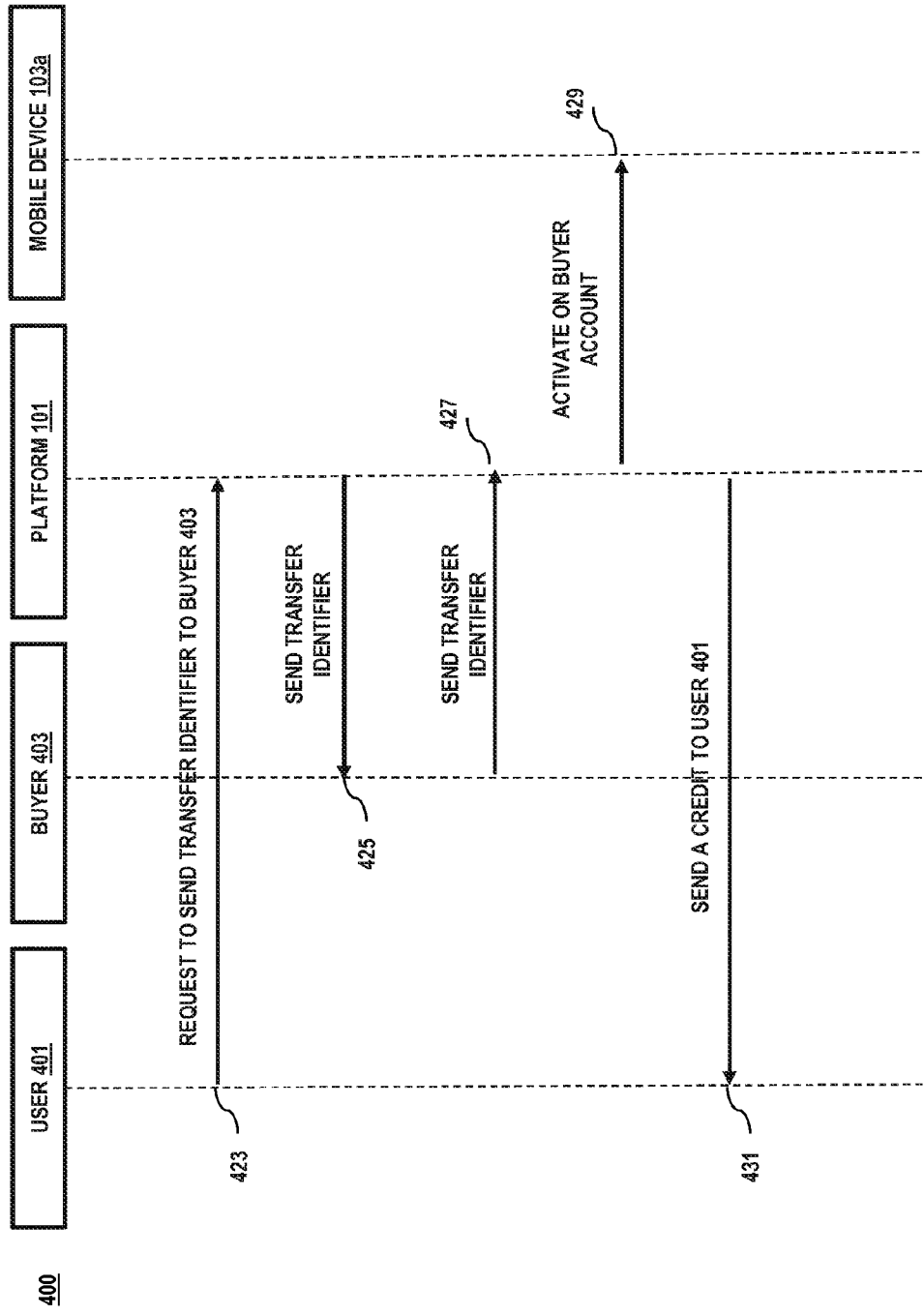

FIGS. 4A and 4B are ladder diagrams of a process for providing authorized transfer of a mobile device, according to an exemplary embodiment. The exemplary process 400 involves the interaction among a user 401, buyer 403, platform 101 and mobile device 103a. In this example, user 401 sends, as in step 411, a request to mark mobile device 103a for sale along with authorization to charge an early termination fee to an account associated with user 401. The platform 101 then confirms the user 401 is authorized to transfer mobile device 103a, and verifies that mobile device 103a is not associated with any restrictions (e.g., past due balance). The platform 101 then sends as in step 413, a control message causing mobile device 103a to display a sale identifier. The sending of a sale identifier to mobile device 103a also deauthorizes mobile device 103a, which prevents further charges to the user 401 relating to mobile device 103a. Mobile device 103a then sends, as in step 415, buyer 403 the sale identifier. The sale identifier may be sent by a display located on mobile device 103a (i.e., seen by a potential buyer), an application of near field communication between mobile device 103a and another mobile device (e.g., mobile device 103b), a SMS text message, and the like.

Once the buyer 403 receives the sale identifier, the buyer 403 sends, as in step 417, the sale identifier to platform 101. The buyer uses a service provider portal 117 accessed using computing device 115. In this manner, the buyer 403 may cause platform 101, as in step 419, to send verification to the buyer 403. The verification includes a statement indicating that mobile device 103a is available for purchase from user 401, along with a device type, model, age, color, time in use, current location, owner name, and owner contact information (e.g., mobile device number). In this manner, buyer 403 is satisfied that mobile device 103a is what user 401 purports and that user 401 is authorized to sell it. The user 401 and buyer 403 then arrange, as in step 421, a purchase/sale of mobile device 103a. In the exemplary process 400, buyer 403 pays user 401 a cash value in exchange for physical possession of mobile device 103a, and the user 401 requesting, as in step 423, platform 101 to send a transfer identifier to buyer 403. The user 401 does not see or have access to the transfer identifier sent to buyer 403 in step 425. The buyer 403 then completes the transfer by sending, as in step 427, the transfer identifier to platform 101. That is, the buyer 403 sends the transfer identifier to platform 101 via service provider portal 117 using computing device 115 by entering the transfer identifier into a graphical user interface associated with the service provider portal 117. The service provider portal 117 and associated graphical user interface are discussed further with respect to FIGS. 5A and 5B. The sending of the transfer identifier causes platform 101 to activate, as in step 429, mobile device 103a onto an account associated with buyer 403. The buyer 403 pays an activation fee, and agrees to a service contract for mobile device 103a. In response to the new service contract between buyer 403 and the service provider (shown as platform 101), platform 101 sends, as in step 431, user 401 a credit on an account associated with user 401. In this manner, a user (e.g., user 401) is encouraged to sell or transfer mobile devices rather than destroy or keep deauthorized mobile devices. It is noted that this incentive to transfer mobile devices can be applied in cases where a mobile device is lost or even stolen because services providers gaining a new customer may grant the original owner a credit to recover expenses. Thus, platform 101 enables users to recoup expenses in replacing lost or stolen mobile devices.

Figure 5A:
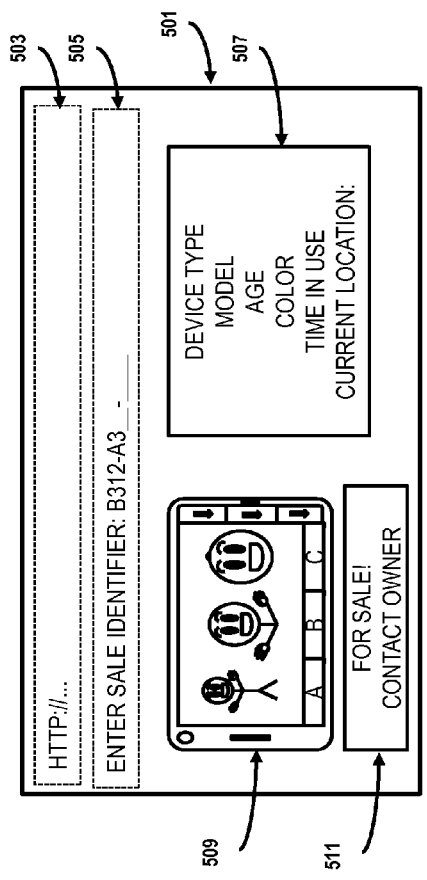
FIGS. 5A and 5B are diagrams of a graphical user interface (GUI) presented via a web portal in support of ownership transfer of a mobile device, according to one embodiment.
Figure 5B:
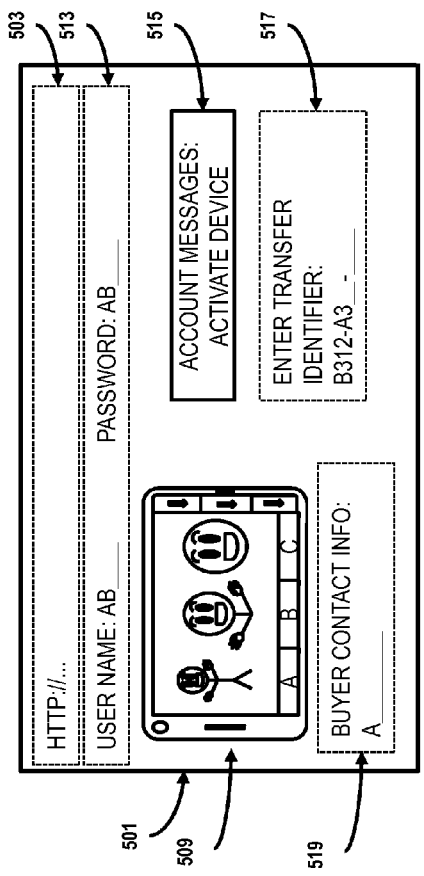

FIGS. 5A and 5B are diagrams of a graphical user interface (GUI) presented via a web portal in support of ownership transfer of a mobile device, according to one embodiment. Specifically, FIG. 5A illustrates a graphical user interface 501 (hereinafter GUI 501) generated by a web portal (e.g., service provider portal 117). In the exemplary embodiment, the web portal causes the display of a GUI 501 on a computing device (e.g., computing device 115) or mobile device (e.g., mobile device 103). The service provider portal 117 may be accessed by use of a uniform resource locator (URL) entered into a web address bar 503. In the exemplary embodiment, the GUI 501 includes a sale identifier prompt 505 configured to accept a user input indicating a sale identifier, a sale identifier information frame 507, a graphical representation 509, and an ownership status information frame 511. The sale identifier information frame 507 shows information relating to the mobile device associated with the sale identifier entered into the sale identifier prompt 505 such as device type, model, age, color, time in use, current location and the like. The graphical representation 509 provides an image of the mobile device associated with the sale identifier, and the ownership status information frame 511 provides ownership information (e.g., whether the mobile device is authorized to transfer, marked for sale, an authorized user, whether the mobile device contains any restrictions to transfer, etc.) relating to the mobile device associated with the sale identifier.

FIG. 5B illustrates a GUI 501 accessible via a web address bar 503. In the exemplary embodiment, GUI 501 includes an account credentials prompt 513 (e.g., user name and password) for accessing a web portal (e.g., service provider portal 117). In order to facilitate a transfer of a mobile device to the account associated with the account credentials entered into account credentials prompt 513, the GUI 501 includes an account message frame 515 and a transfer identifier prompt 517 configured to accept a user input indicating a transfer identifier. The account message frame 515 allows the service provider portal 117 to send messages, which may contain a transfer identifier. Additionally, or alternatively, a user may input the transfer identifier into the transfer identifier prompt 517.

In order to facilitate a transfer of a mobile device from the account associated with the account credentials entered into account credentials prompt 513 to another account, the GUI 501 includes a buyer contact information prompt 519 configured to accept a user input indicating a communication method to send a user a transfer identifier associated with the mobile device and the graphical representation 509. The input into information prompt 519 may include, for example, an e-mail address, mobile device number (MDN), account name or alias, and the like.

Figure 6B:
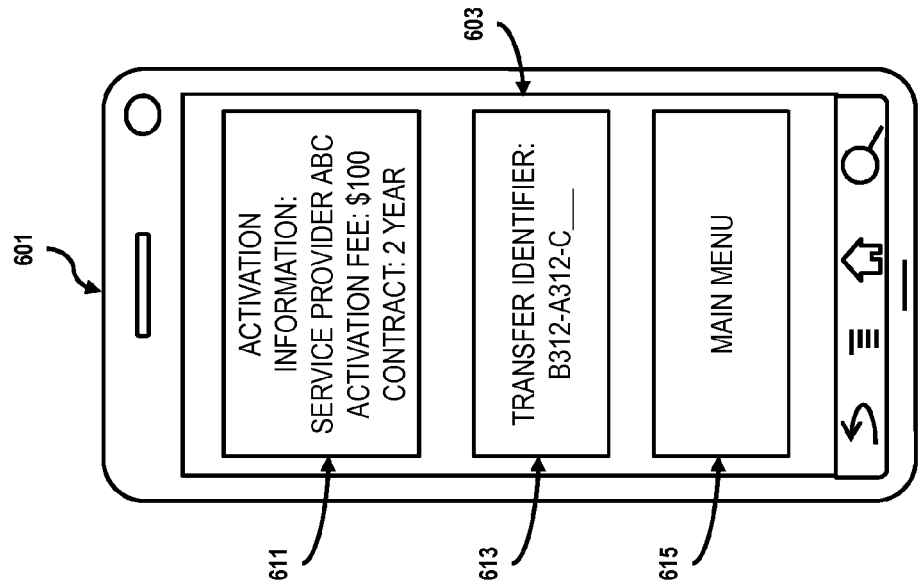
FIGS. 6A and 6B are diagrams of a GUI utilized by a mobile device to perform ownership transfer, according to various embodiments.
Figure 6A:
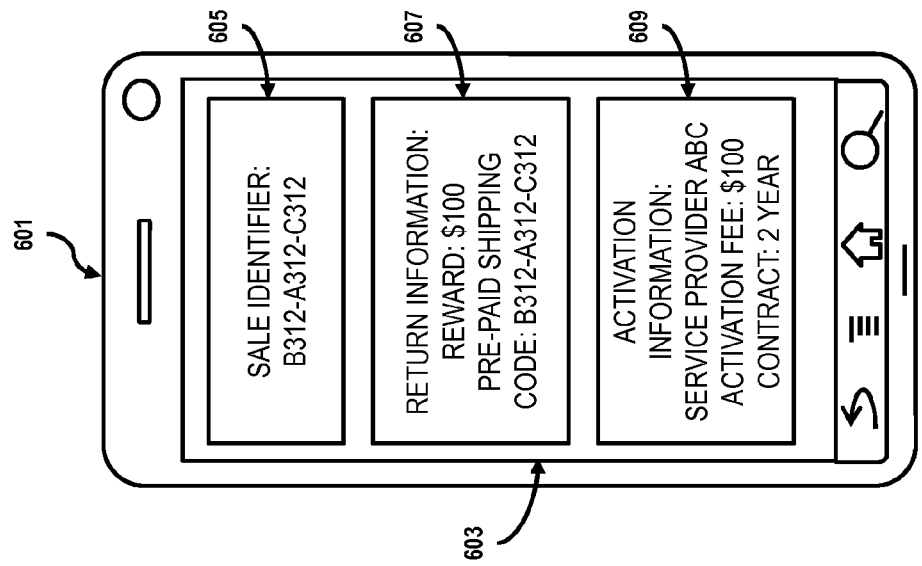

FIGS. 6A and 6B are diagrams of a GUI utilized by a mobile device to perform ownership transfer, according to various embodiments. FIG. 6A illustrates the GUI 603 displayed on a mobile device 601 (e.g., mobile device 103). GUI 603 includes a selectable sale identifier option 605, a selectable return information option 607, and a selectable activation option 609. The selectable sale identifier option 605 may show information relating to the mobile device 601; such as, a sale identifier number, mobile device type, usage, and the like. Likewise, the selectable return information option 607 may show information to facilitate the return of the mobile device to a primary user; such as, a reward amount, shipping information, and contact information. Further, the selectable activation option 609 may show information relating to a process to activate the mobile device on another account such as an identification of a service provider associated with the mobile device, information on an activation charge, contract terms, and the like. When selected, the selectable options 605, 607, and 609 may cause the display of additional information relating to the selected option. For example, the selection of activation option 609, causes the display of the options shown in FIG. 6B.

As seen in FIG. 6B, the GUI 603 can include a selectable activation information option 611, a selectable transfer identifier option 613, and a selectable main menu option 615. The selectable activation information option 611 may show information relating to a process to activate the mobile device 601 on another account such as an identification of a service provider associated with the mobile device 601, information on an activation charge, contract terms, and the like. The selectable transfer identifier option 613 allows for the input of a transfer identifier number. For example, a user may, by use of a web portal GUI (e.g., GUI 501) obtain a transfer identifier associated with the mobile device 601 and input the obtained transfer identifier directly into the mobile device 601. The selection of selectable main menu option 615 causes the mobile device 601 to display another set of selectable options, for example, the selectable options 605, 607, and 609 discussed in FIG. 6A.

As described, features of system 100 may be implemented using platform 101 to provide the authorized transfer of a mobile device. Users purchasing (i.e., buyers) mobile devices benefit from having a secure means to verify and transfer mobile devices prior to payment and users selling (i.e., sellers) mobile devices benefit from the secure means to transfer and also from an increase of demand for mobile devices. Further, users of system 100 may recuperate expenses due to a lost or stolen mobile device by enabling another user to activate the mobile device. In this manner, a service provider gains an additional customer and the user recuperates expenses through a credit from the service provider. Additionally, system 100 may be used to facilitate the recovery of a lost or stolen mobile device by deauthorizing services and causing the display of return information.

The processes described herein for providing authorized transfer of a mobile device may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
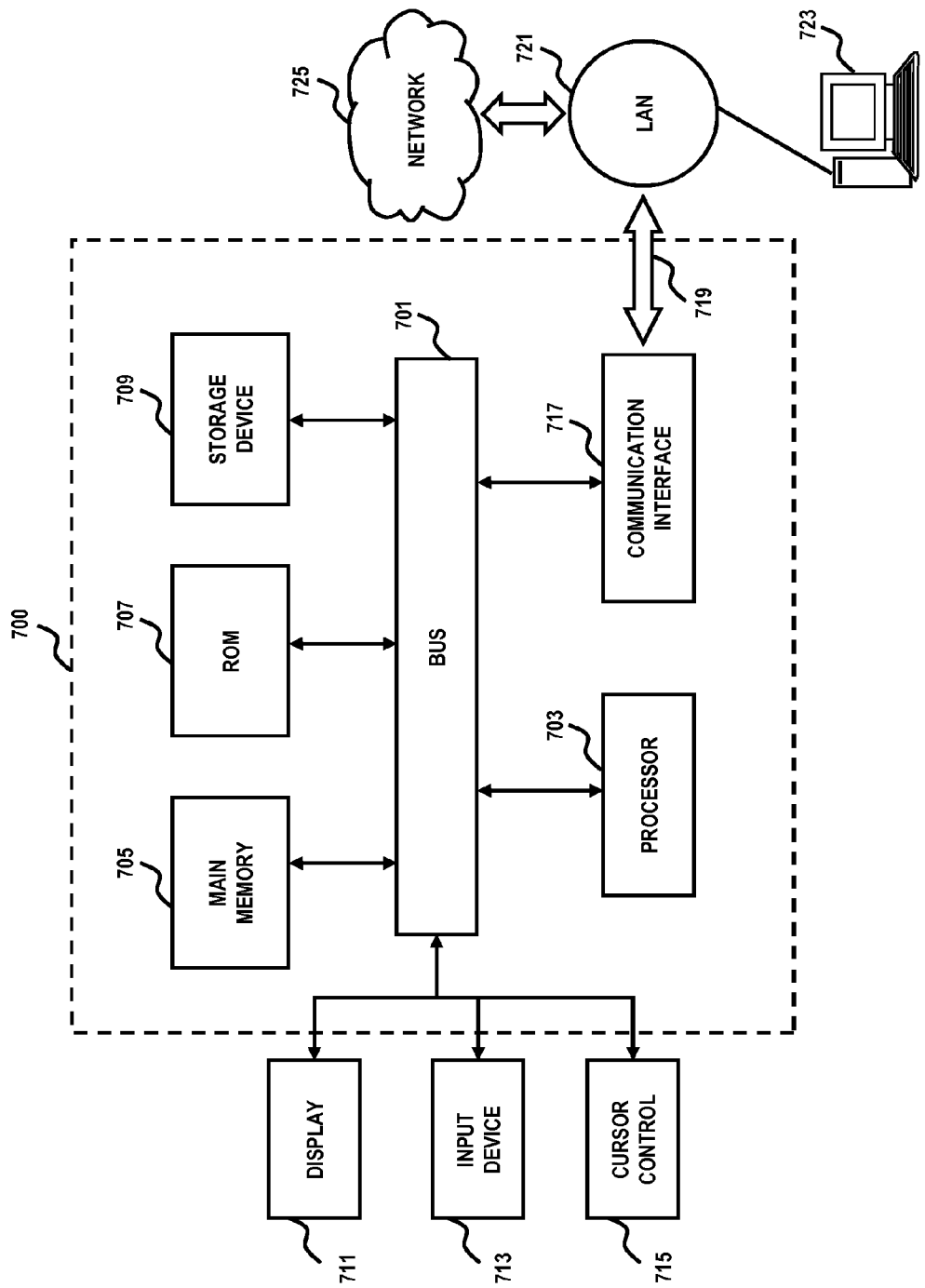
FIG. 7 is a diagram of a computer system that can be used to implement various exemplary embodiments.

FIG. 7 is a diagram of a computer system that can be used to implement various exemplary embodiments. The computer system 700 includes a bus 701 or other communication mechanism for communicating information and one or more processors (of which one is shown) 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk, flash storage, or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. Additional output mechanisms may include haptics, audio, video, etc. An input device 713, such as a keyboard including alphanumeric and other keys, is coupled to the bus 701 for communicating information and command selections to the processor 703. Another type of user input device is a cursor control 715, such as a mouse, a trackball, touch screen, or cursor direction keys, for communicating direction information and command selections to the processor 703 and for adjusting cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 8:
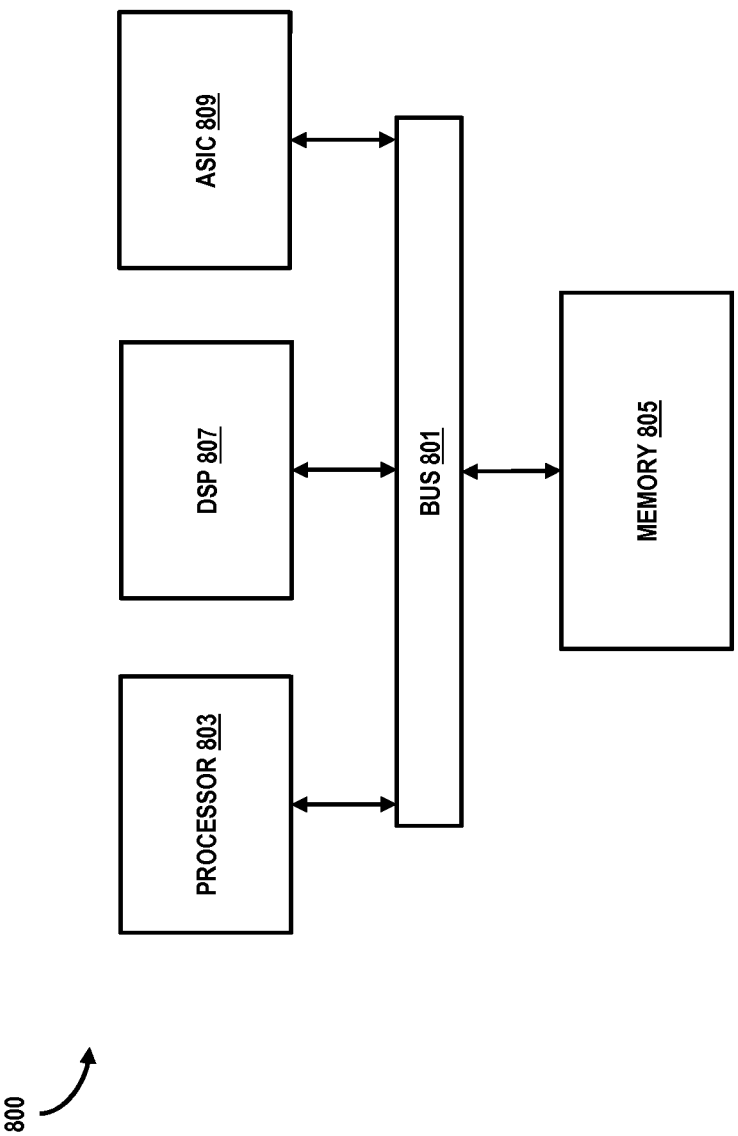
FIG. 8 is a diagram of a chip set that can be used to implement an embodiment of the invention.

FIG. 8 illustrates a chip set or chip 800 upon which an embodiment of the invention may be implemented. Chip set 800 is programmed to enable authorized transfer of a mobile device as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of enabling authorized transfer of a mobile device.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to enable authorized transfer of a mobile device. The memory 805 also stores the data associated with or generated by the execution of the inventive steps.

Figure 9:
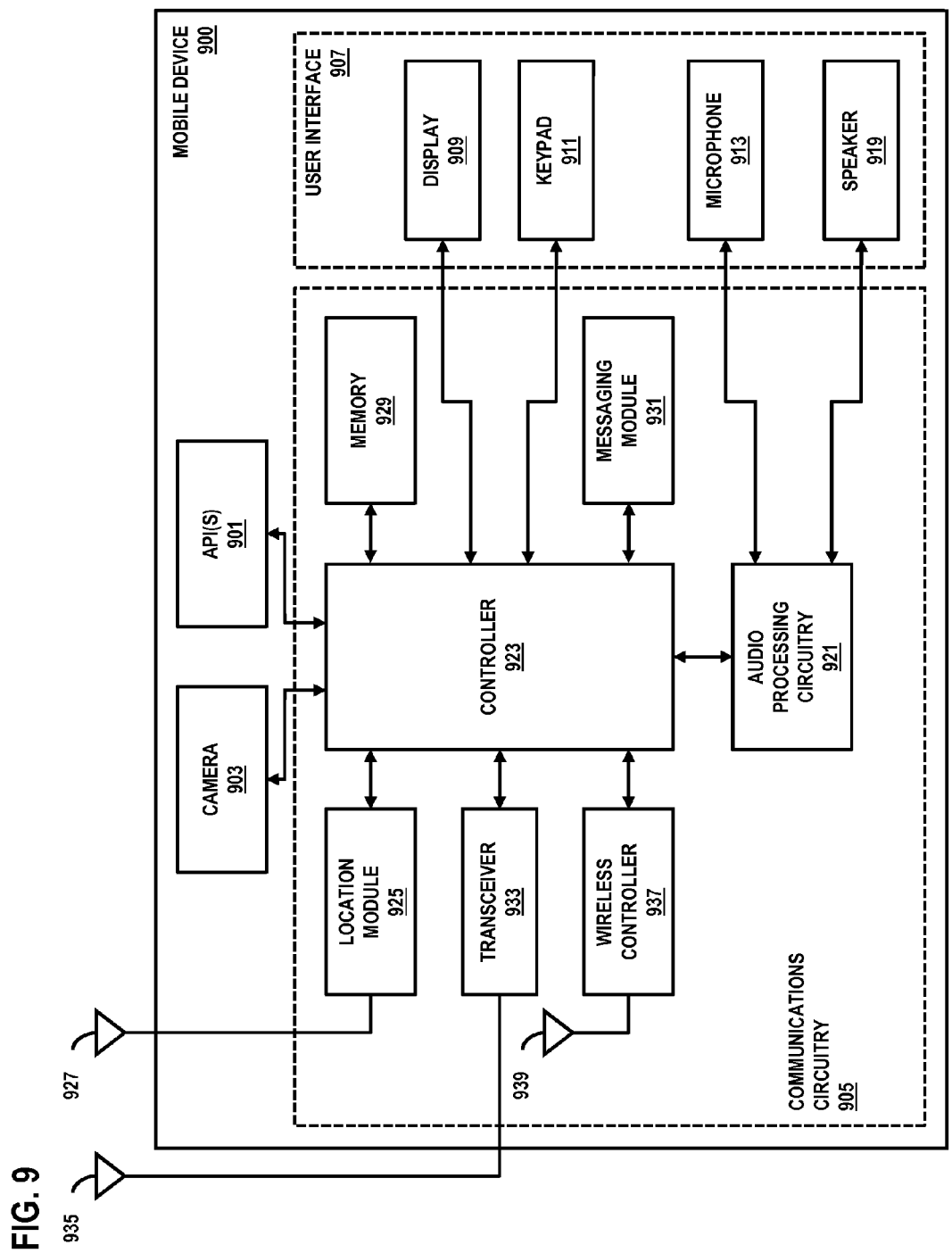
FIG. 9 is a diagram of a mobile device configured to facilitate the authorized transfer of a mobile device, according to an exemplary embodiment.

FIG. 9 is a diagram of a mobile device configured to facilitate an authorized transfer of a mobile device, according to an exemplary embodiment. Mobile device 900 (e.g., equivalent to the mobile device 103) may comprise computing hardware (such as described with respect to FIGS. 7 and 8), as well as include one or more components configured to execute the processes described herein for facilitating the authorized transfer services of system 100. In this example, mobile device 900 includes application programming interface(s) 901, camera 903, communications circuitry 905, and user interface 907. While specific reference will be made hereto, it is contemplated that mobile device 900 may embody many forms and include multiple and/or alternative components.

According to exemplary embodiments, user interface 907 may include one or more displays 909, keypads 911, microphones 913, and/or speakers 919. Display 909 provides a graphical user interface (GUI) that permits a user of mobile device 900 to view dialed digits, call status, menu options, and other service information. Specifically, the display 909 may allow viewing of, for example, a sale identifier. The GUI may include icons and menus, as well as other text and symbols. Keypad 911 includes an alphanumeric keypad and may represent other input controls, such as one or more button controls, dials, joysticks, touch panels, etc. The user thus can construct user profiles, enter commands, initialize applications, input remote addresses, select options from menu systems, and the like. Specifically, the keypad 911 may enable the inputting of settings, and the requesting of change in ownership information. Microphone 913 coverts spoken utterances of a user (or other auditory sounds, e.g., environmental sounds) into electronic audio signals, whereas speaker 919 converts audio signals into audible sounds. A camera 903 may be used as an input device to detect images, for example a QR code, or sale identifier.

Communications circuitry 905 may include audio processing circuitry 921, controller 923, location module 925 (such as a GPS receiver) coupled to antenna 927, memory 929, messaging module 931, transceiver 933 coupled to antenna 935, and wireless controller 937 coupled to antenna 939. Memory 929 may represent a hierarchy of memory, which may include both random access memory (RAM) and read-only memory (ROM). Computer program instructions and corresponding data for operation can be stored in non-volatile memory, such as erasable programmable read-only memory (EPROM), electrically erasable programmable read-only memory (EEPROM), and/or flash memory. Memory 929 may be implemented as one or more discrete devices, stacked devices, or integrated with controller 923. Memory 929 may store information, such as contact lists, preference information, and the like. As previously noted, it is contemplated, that functions performed by platform 101 may be performed by the mobile device 900.

Additionally, it is contemplated that mobile device 900 may also include one or more applications and, thereby, may store (via memory 929) data associated with these applications for providing users with browsing functions, business functions, calendar functions, communication functions, contact managing functions, data editing (e.g., database, word processing, spreadsheets, etc.) functions, financial functions, gaming functions, imaging functions, messaging (e.g., electronic mail, IM, MMS, SMS, etc.) functions, multimedia functions, service functions, storage functions, synchronization functions, task managing functions, querying functions, and the like. As such, signals received by mobile device 900 from, for example, platform 101 may be utilized by API(s) 901 and/or controller 923 to facilitate the sharing of information, and improving the user experience.

Accordingly, controller 923 controls the operation of mobile device 900, such as in response to commands received from API(s) 901 and/or data stored to memory 929. Control functions may be implemented in a single controller or via multiple controllers. Suitable controllers 923 may include, for example, both general purpose and special purpose controllers and digital signal processors. Controller 923 may interface with audio processing circuitry 921, which provides basic analog output signals to speaker 919 and receives analog audio inputs from microphone 913.

Mobile device 900 also includes messaging module 931 that is configured to receive, transmit, and/or process messages (e.g., enhanced messaging service (EMS) messages, SMS messages, MMS messages, instant messaging (IM) messages, electronic mail messages, and/or any other suitable message) received from (or transmitted to) platform 101 or any other suitable component or facility of system 100. As such, messaging module 931 may be configured to receive, transmit, and/or process information shared by the mobile device 900. For example, platform 101 can send an SMS notifying a user of a request to verify a sale identifier.

It is also noted that mobile device 900 can be equipped with wireless controller 937 to communicate with a wireless headset (not shown) or other wireless network. The headset can employ any number of standard radio technologies to communicate with wireless controller 937; for example, the headset can be BLUETOOTH enabled. It is contemplated that other equivalent short range radio technology and protocols can be utilized. While mobile device 900 has been described in accordance with the depicted embodiment of FIG. 9, it is contemplated that mobile device 900 may embody many forms and include multiple and/or alternative components.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving by an apparatus a request to modify ownership status information for a mobile device;
   verifying by the apparatus whether the request is authorized by an owner of the mobile device; and
   when the request is verified as authorized by the owner, generating by the apparatus in response to the request, a sale identifier based on the ownership status information, wherein the sale identifier provides verification that the mobile device can be subject to a transfer of ownership between the owner and a different user, and specifies device information associated with the mobile device.

2. The method according to claim 1, wherein the sale identifier includes information relating to a type of the mobile device, model of the mobile device, age of the mobile device, color of the mobile device, time of mobile device use, current location of the mobile device, identity of owner of the mobile device, or a combination thereof,
   wherein the request is verified via notifying the owner of the request.

3. The method according to claim 1, further comprising:
   deauthorizing the mobile device from a user account of the owner, wherein the deauthorizing causes one or more features associated with the mobile device to be disabled, and wherein the mobile device remains associated with the user account.

4. The method according to claim 1, further comprising:
   receiving the sale identifier;
   determining whether the received sale identifier is associated with the mobile device; and retrieving, in response to the determination, sale verification information that includes a verification that ownership of the mobile device can be transferred by the owner to the different user.

5. The method according to claim 4, wherein the sale verification information includes information relating to an owner of the mobile device, a date the sale identifier was generated, or a combination thereof.

6. The method according to claim 1, further comprising:
sending the generated sale identifier to the mobile device for publication of one or more advertisements of the mobile device for sale by the owner, wherein the sale identifier is linked to a portal of a service provider that verifies the request as authorized by the owner.

7. The method according to claim 1, further comprising:
receiving, from a user account of the owner, authorization to transfer ownership of the mobile device, from the user account of the owner to another user account of the different user; and
generating a transfer identifier associated with the sale identifier, wherein the other user account is provided access to the transfer identifier.

8. The method according to claim 7, further comprising:
receiving another request to associate the transfer identifier with the other user account, wherein the other request includes the transfer identifier;
updating the ownership status information of the mobile device to associate the mobile device with the other user account requesting to be associated with the transfer identifier; and
updating the sale identifier and the transfer identifier based on the updating of ownership status information.

9. The method according to claim 1, further comprising:
storing the sale identifier among a plurality of sale identifiers corresponding to other mobile devices.

10. The method according to claim 1, further comprising:
generating a transfer identifier based on the sale identifier if there are no transfer restrictions on a user account of the owner;
determining whether the mobile device is activated on another user account of the different user; and
adding a credit to the user account based on the activation of the mobile device on the other user account.

11. An apparatus comprising:
at least one processor; and
at least one memory including computer program code for one or more programs,
the at least one memory and the computer program code configured to, with the at least one processor, cause the apparatus to perform at least the following:
receive a request to modify ownership status information for a mobile device;
verify whether the request is authorized by an owner of the mobile device; and
when the request is verified as authorized by the owner, generate in response to the request, a sale identifier based on the ownership status information, wherein the sale identifier provides verification that the mobile device can be subject to a transfer of ownership between the owner and a different user, and specifies device information associated with the mobile device.

12. The apparatus according to claim 11, wherein the sale identifier includes information relating to a type of the mobile device, model of the mobile device, age of the mobile device, color of the mobile device, time of mobile device use, current location of the mobile device, identity of owner of the mobile device, or a combination thereof.

13. The apparatus according to claim 11, wherein the apparatus is further caused to:
deauthorize the mobile device from a user account of the owner, wherein the deauthorizing causes one or more features associated with the mobile device to be disabled, and wherein the mobile device remains associated with the user account.

14. The apparatus according to claim 11, wherein the apparatus is further caused to:
receive the sale identifier;
determine whether the received sale identifier is associated with the mobile device; and
retrieve, in response to the determination, sale verification information that includes a verification that ownership of the mobile device can be transferred the owner to the different user.

15. The apparatus according to claim 14, wherein the sale verification information includes information relating to an owner of the mobile device, a date the sale identifier was generated, or a combination thereof.

16. The apparatus according to claim 11, wherein the apparatus is further caused to:
send the generated sale identifier to the mobile device for presentation by the mobile device.

17. The apparatus according to claim 11, wherein the apparatus is further caused to:
receive, from a user account of the owner, authorization to transfer ownership of the mobile device, from the user account of the owner to another user account of the different user; and
generate a transfer identifier associated with the sale identifier, wherein the other user account is provided access to the transfer identifier.

18. The apparatus according to claim 17, wherein the apparatus is further caused to:
receive another request to associate the transfer identifier with the other user account, wherein the other request includes the transfer identifier;
update the ownership status information of the mobile device to associate the mobile device with the other user account requesting to be associated with the transfer identifier; and
update the sale identifier and the transfer identifier based on the updating of ownership status information.

19. The apparatus according to claim 11, wherein the apparatus is further caused to:
store the sale identifier among a plurality of sale identifiers corresponding to other mobile devices.

20. The apparatus according to claim 11, wherein the apparatus is further caused to:
generate a transfer identifier based on the sale identifier if there are no transfer restrictions on a user account of the owner;
determine whether the mobile device is activated on another user account of the different user; and
add a credit to the user account based on the activation of the mobile device on the other user account.

21. A system comprising:
a platform, comprising one or more processors, configured to receive a request to modify ownership status information for a mobile device, verify whether the request is authorized by an owner of the mobile device, and when the request is verified as authorized by the owner, generate in response to the request, a sale identifier based on the ownership status information,
wherein the sale identifier provides verification that the mobile device can be subject to a transfer of ownership between the owner and a different user, and specifies device information associated with the mobile device.

22. The system according to claim 21, wherein the platform is further configured to:
receive, from a user account of the owner associated with the sale identifier, authorization to transfer ownership of the mobile device, to another user account of the different user;
generate a transfer identifier based on the sale identifier if there are no restrictions on the user account, wherein the other user account is provided access to the transfer identifier;
receive a request to associate the transfer identifier with the other user account, wherein the request includes the transfer identifier;
update the ownership status information of the mobile device to associate the mobile device with the other user account requesting to be associated with the transfer identifier; and
update the sale identifier and the transfer identifier based on the updating of ownership status information.

* * * * *